US011951533B2

(12) United States Patent
Shinoda et al.

(10) Patent No.: US 11,951,533 B2
(45) Date of Patent: Apr. 9, 2024

(54) METHOD OF MANUFACTURING ALUMINUM ALLOY WIRE, METHOD OF MANUFACTURING ELECTRIC WIRE AND METHOD OF MANUFACTURING WIRE HARNESS USING THE SAME

(71) Applicant: Fujikura Ltd., Tokyo (JP)

(72) Inventors: Tatsunori Shinoda, Chiba (JP); Naoki Kaneko, Chiba (JP); Tsuyoshi Yoshioka, Chiba (JP)

(73) Assignee: Fujikura Ltd., Tokyo (JP)

( * ) Notice: Subject to any disclaimer, the term of this patent is extended or adjusted under 35 U.S.C. 154(b) by 203 days.

(21) Appl. No.: 16/770,311

(22) PCT Filed: Sep. 6, 2018

(86) PCT No.: PCT/JP2018/032978
§ 371 (c)(1),
(2) Date: Jun. 5, 2020

(87) PCT Pub. No.: WO2019/111468
PCT Pub. Date: Jun. 13, 2019

(65) Prior Publication Data

US 2021/0180168 A1 Jun. 17, 2021

(30) Foreign Application Priority Data

Dec. 6, 2017 (JP) ................................ 2017-233889

(51) Int. Cl.
*C22C 21/08* (2006.01)
*B22D 11/06* (2006.01)
(Continued)

(52) U.S. Cl.
CPC ...... *B22D 11/0645* (2013.01); *B22D 11/0622* (2013.01); *C22C 21/02* (2013.01);
(Continued)

(58) Field of Classification Search
None
See application file for complete search history.

(56) References Cited

U.S. PATENT DOCUMENTS

2012/0217060 A1 8/2012 Kusakari et al.
2013/0264115 A1* 10/2013 Kobayashi .............. C22C 21/06 420/544
(Continued)

FOREIGN PATENT DOCUMENTS

CN 103298963 A 9/2013
CN 104781432 A 7/2015
(Continued)

OTHER PUBLICATIONS

Semiatin, S.L. "Rotary Swaging of Bars and Tubes", ASM Handbook vol. 14A: Metalworking Bulkforming, p. 156-171. (Year: 2005).*
(Continued)

*Primary Examiner* — George Wyszomierski
*Assistant Examiner* — Janell C Morillo
(74) *Attorney, Agent, or Firm* — Osha Bergman Watanabe & Burton LLP

(57) ABSTRACT

A method of manufacturing an aluminum alloy wire includes: forming a rough drawing wire composed of an aluminum alloy containing aluminum, an additive element, and unavoidable impurities, the additive element including Si and Mg; obtaining an aluminum alloy wire by performing a treatment on the rough drawing wire, wherein the treatment includes at least one or more wire drawing treatments; forming a first solution treatment material by forming a solid solution of the aluminum and the additive element and then performing a quenching treatment on the solid solution, wherein the first solution treatment is performed directly before the last of the one or more wire drawing treatments is performed; a second solution treatment that forms a
(Continued)

second solution treatment material by forming a solid solution of the aluminum and the additive element and then performing a quenching treatment on the solid solution.

10 Claims, 4 Drawing Sheets

(51) Int. Cl.

| | |
|---|---|
| ***C22C 21/02*** | (2006.01) |
| ***C22F 1/04*** | (2006.01) |
| ***C22F 1/043*** | (2006.01) |
| ***C22F 1/05*** | (2006.01) |
| ***H01B 1/02*** | (2006.01) |
| ***H01B 13/012*** | (2006.01) |

(52) U.S. Cl.
CPC ................ *C22C 21/08* (2013.01); *C22F 1/04* (2013.01); *C22F 1/043* (2013.01); *C22F 1/05* (2013.01); *H01B 1/023* (2013.01); *H01B 13/012* (2013.01)

(56) References Cited

U.S. PATENT DOCUMENTS

| | | | |
|---|---|---|---|
| 2017/0226615 A1 | 8/2017 | Imasato et al. | |
| 2017/0253954 A1 | 9/2017 | Yoshida et al. | |
| 2017/0356069 A1 | 12/2017 | Goto et al. | |

FOREIGN PATENT DOCUMENTS

| | | | |
|---|---|---|---|
| CN | 104797724 | A | 7/2015 |
| CN | 105970035 | A | 9/2016 |
| CN | 106574352 | A | 4/2017 |
| CN | 106605003 | A | 4/2017 |
| CN | 107002183 | A | 8/2017 |
| CN | 107034390 | A | 8/2017 |
| EP | 2641985 | A1 | 9/2013 |
| EP | 2896707 | A1 | 7/2015 |
| EP | 2902517 | A1 | 8/2015 |
| EP | 2987880 | A1 | 2/2016 |
| EP | 3116069 | A1 | 1/2017 |
| EP | 3150732 | A1 | 4/2017 |
| EP | 3199654 | A1 | 8/2017 |
| JP | 2010-265509 | A | 11/2010 |
| JP | 2012-229485 | A | 11/2012 |
| JP | 2017-218645 | A | 12/2017 |
| JP | 2018-150610 | A | 9/2018 |
| WO | 2011/052644 | A1 | 5/2011 |
| WO | 2015182624 | A1 | 12/2015 |
| WO | 2016/047617 | A1 | 3/2016 |

OTHER PUBLICATIONS

International Preliminary Report on Patentability issued for International Application No. PCT/JP2018/032978, dated Jun. 9, 2020 (19 pages).
International Search Report issued in corresponding International Application No. PCT/JP2018/032978 dated Dec. 11, 2018 (3 pages).
Extended European Search Report issued in the counterpart European Patent Application No. 18885536.5, dated Feb. 18, 2021 (8 pages).
Office Action issued in the counterpart Chinese Patent Application No. 201880070133.2, dated Mar. 1, 2021 (7 pages).

* cited by examiner

METHOD OF MANUFACTURING ALUMINUM ALLOY WIRE, METHOD OF MANUFACTURING ELECTRIC WIRE AND METHOD OF MANUFACTURING WIRE HARNESS USING THE SAME

TECHNICAL FIELD

One or more embodiments of the present invention relate to a method of manufacturing an aluminum alloy wire, a method of manufacturing an electric wire and a method of manufacturing a wire harness using the same.

BACKGROUND

In recent years, from the viewpoint of simultaneously satisfying weight reduction, bending resistance, and impact resistance, an aluminum alloy wire made of an aluminum alloy has been used in place of the copper wire as strands of electric wires of a wire harness or the like.

As a method of manufacturing such an aluminum alloy wire, for example, the following patent document 1 discloses a manufacturing method that performs a wire drawing processing and a solution treatment step sequentially to a wire rod (rough drawing wire) composed of aluminum alloy containing Si and Mg, and then performs an aging hardening treatment step.

CITATION LIST

Patent Document 1: JP 2010-265509A

However, the method of manufacturing the aluminum alloy wire described in the above-mentioned patent document 1 has had room for improvement in terms of improvement of tensile strength and elongation of the obtained aluminum alloy wire.

SUMMARY

One or more embodiments of the present invention may provide a method of manufacturing an aluminum alloy wire capable of improving tensile strength and elongation of the obtained aluminum alloy wire, a method of manufacturing an electric wire and a method of manufacturing a wire harness using the same.

The present inventors have found that the above properties may be provided by the following invention.

That is, one or more embodiments of the present invention is a method of manufacturing an aluminum alloy wire, which includes a rough drawing wire forming step of forming a rough drawing wire composed of an aluminum alloy consisting of aluminum, an additive element and unavoidable impurities, the additive element including at least Si and Mg; and a rough drawing wire treatment step of obtaining an aluminum alloy wire by performing a treatment step on the rough drawing wire, wherein the treatment step includes at least one wire drawing treatment step; a first solution treatment step of forming a first solution treatment material by forming a solid solution of the aluminum and the additive element and then performing a quenching treatment, the first solution treatment step being performed immediately before (i.e., directly before) the last wire drawing treatment step among the at least one wire drawing treatment step; a second solution treatment step of forming a second solution treatment material by forming a solid solution of the aluminum and the additive element and then performing a quenching treatment, the second solution treatment step being performed immediately after (i.e., directly after) the last wire drawing treatment step; and an aging treatment step which is performed after the second solution treatment step.

According to the method of manufacturing the aluminum alloy wire of one or more embodiments of the present invention, the tensile strength and elongation of the obtained aluminum alloy wire can be improved.

In addition, the present inventors assume that the above effect can be obtained by the method of manufacturing the aluminum alloy wire of one or more embodiments of the present invention for the following reason.

That is, in the method of manufacturing the aluminum alloy wire of one or more embodiments of the present invention, since in the treatment step performed on the rough drawing wire, the first solution treatment step is performed immediately before the last wire drawing treatment step among the at least one wire drawing treatment step, and the second solution treatment step is performed immediately after the last wire drawing treatment step, it is considered that the second solution treatment material having fine crystal grains is obtained. As a result, it is considered that elongation of the second solution treatment material can be improved. Then, the present inventors assume that the tensile strength and elongation of the obtained aluminum alloy wire can be improved by performing the aging treatment of this second solution treatment material.

In the above-mentioned manufacturing method, it is preferable that the content of Si in the aluminum alloy be 0.35 mass % or more and 0.75 mass % or less, the content of Mg in the aluminum alloy be 0.3 mass % or more and 0.7 mass % or less, the content of Fe in the aluminum alloy be 0.6 mass % or less, and the content of Cu in the aluminum alloy be 0.4 mass % or less, and the total content of Ti, V and B in the aluminum alloy be 0.06 mass % or less.

In this case, an aluminum alloy wire which can satisfy excellent tensile strength and elongation and is excellent in conductivity can be obtained.

In the above-mentioned manufacturing method, it is preferable that in the second solution treatment step, the formation of the solid solution be performed at a temperature of 500 to 600° C. (i.e., between 500 to 600° C., inclusive) for 10 minutes or less.

In this case, the tensile strength and elongation of the obtained aluminum alloy wire can be more remarkably improved.

In the above-mentioned manufacturing method, it is preferable that in the second solution treatment step, the formation of the solid solution be performed for one minute or less.

In this case, compared to a case where the formation of the solid solution is performed for more than one minute in the second solution treatment step, the tensile strength and elongation of the obtained aluminum alloy wire can be even more remarkably improved.

In the above-mentioned manufacturing method, it is preferable that in the second solution treatment step, the formation of the solid solution be performed for longer than seconds.

In this case, higher tensile strength and elongation can be obtained in the obtained aluminum alloy wire.

In the above-mentioned manufacturing method, it is preferable that in the first solution treatment step, the formation of the solid solution be performed for longer than the time for forming the solid solution in the second solution treatment step.

In this case, compared to a case where in the first solution treatment step the formation of the solid solution is performed for not longer than a time for forming a solid solution in the second solution treatment step, the tensile strength and elongation of the obtained aluminum alloy wire are further remarkably improved.

In the manufacturing method, it is preferable that in the aging treatment step, $Mg_2Si$ be formed as a precipitate in the aluminum alloy constituting the second solution treatment material obtained in the second solution treatment step.

In this case, compared to a case where in the aging treatment step $Mg_2Si$ is not formed as a precipitate in the aluminum alloy constituting the second solution treatment material obtained in the second solution treatment step, the tensile strength of the obtained aluminum alloy wire is more remarkably improved.

Further, one or more embodiments of the present invention is a method of manufacturing an electric wire, which includes an aluminum alloy wire preparation step of preparing an aluminum alloy wire by the above-mentioned method of manufacturing the aluminum alloy wire, and an electric wire manufacturing step of coating the aluminum alloy wire with a coating layer to manufacture an electric wire.

According to the method of manufacturing the electric wire, the tensile strength and elongation of the obtained aluminum alloy wire can be improved by the aluminum alloy wire preparation step. For this reason, an electric wire obtained by coating such an aluminum alloy wire with the coating layer is useful as an electric wire disposed in a dynamic part in which bending or vibration is applied (for example, a door part of an automobile or in the vicinity of an engine of an automobile).

Further, one or more embodiments of the present invention is a method of manufacturing a wire harness, which includes an electric wire preparation step of preparing an electric wire by the above-mentioned method of manufacturing the electric wire, and a wire harness manufacturing step of manufacturing a wire harness by using a plurality of the electric wires.

According to the method of manufacturing the wire harness, the tensile strength and elongation of the obtained aluminum alloy wire can be improved by the aluminum alloy wire preparation step included in the electric wire preparation step. For this reason, the wire harness including the electric wire obtained by coating such an aluminum alloy wire with the coating layer is useful as a dynamic part in which bending or vibration is applied (for example, a door part of an automobile or in the vicinity of an engine of an automobile).

One or more embodiments of the present invention provide a method of manufacturing an aluminum alloy wire capable of improving tensile strength and elongation of the obtained aluminum alloy wire, a method of manufacturing an electric wire, and a method of manufacturing a wire harness using the same.

DETAILED DESCRIPTION OF THE EMBODIMENTS

[Method of Manufacturing Aluminum Alloy Wire]

Figure 1:
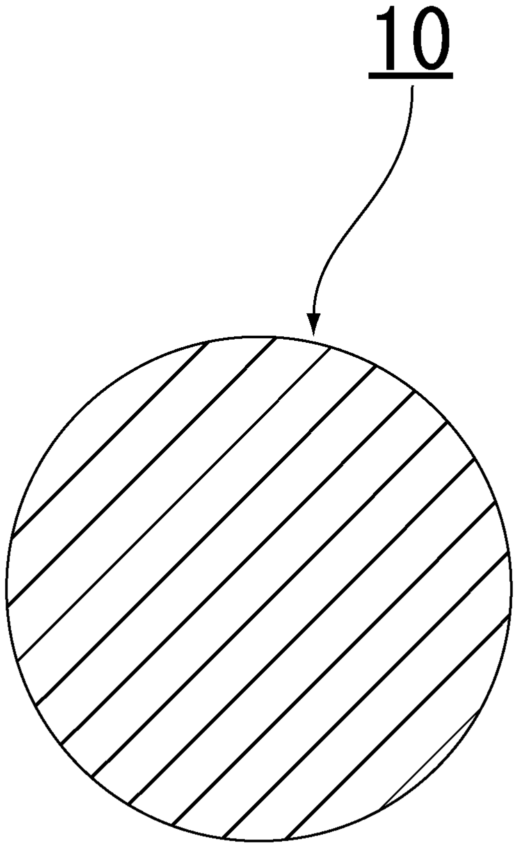
FIG. 1 is a cross-sectional view showing an aluminum alloy wire obtained by a method of manufacturing an aluminum alloy wire of one or more embodiments of the present invention.

Hereinafter, one or more embodiments of the present invention will be described with reference to FIG. 1. FIG. 1 is a cross-sectional view showing an example of an aluminum alloy wire obtained by the method of manufacturing the aluminum alloy wire of one or more embodiments of the present invention.

As shown in FIG. 1, an aluminum alloy wire 10 is composed of an aluminum alloy which consists of aluminum, the additive element and unavoidable impurities and in which the additive element contains at least Si and Mg.

Figure 2:
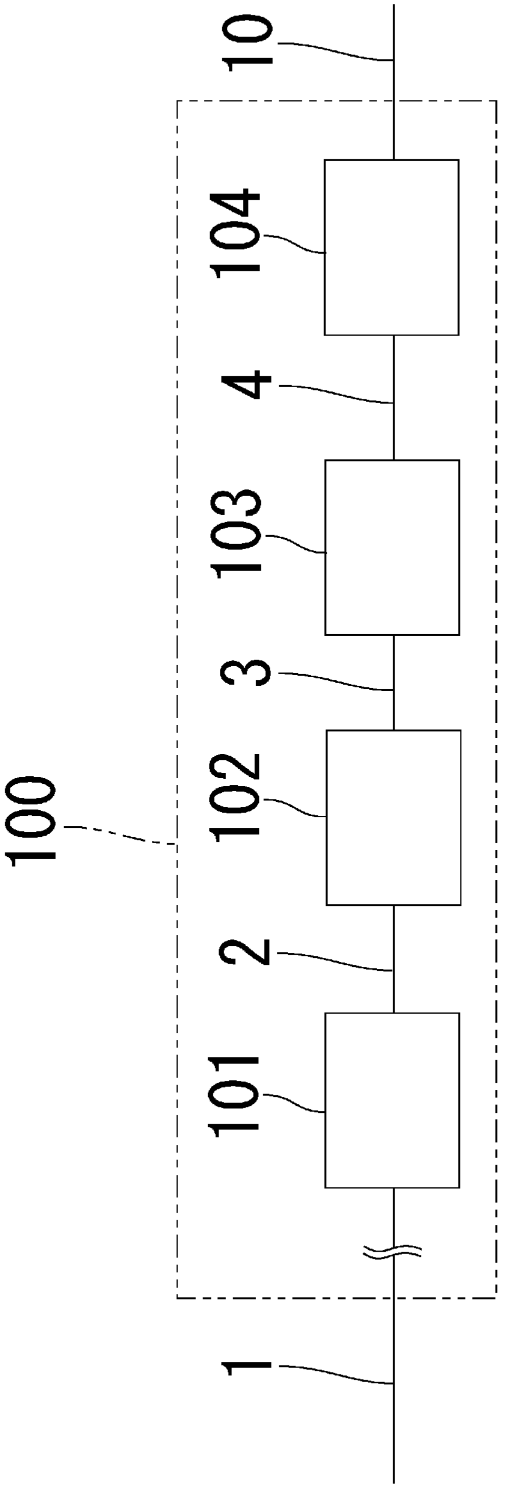
FIG. 2 is a schematic view showing a method of manufacturing an aluminum alloy wire of one or more embodiments of the present invention.

Next, a method of manufacturing the aluminum alloy wire 10 will be described with reference to FIG. 2. FIG. 2 is a schematic view showing a method of manufacturing an aluminum alloy wire of one or more embodiments of the present invention.

As shown in FIG. 2, the method of manufacturing the aluminum alloy wire 10 includes a rough drawing wire forming step of forming a rough drawing wire 1 composed of an aluminum alloy which consists of aluminum, an additive element and unavoidable impurities, and in which the additive element includes at least Si and Mg, and a rough drawing wire treatment step of obtaining the aluminum alloy wire 10 by performing a treatment step on the rough drawing wire 1. In the rough drawing wire treatment step, the treatment step is performed in a rough drawing wire treatment part 100 of FIG. 2. The treatment step includes at least one wire drawing treatment step, a first solution treatment step of forming a first solution treatment material 2 by forming a solid solution of the aluminum and the additive element and then performing a quenching treatment, the first solution treatment step being performed immediately before the last wire drawing treatment step among the at least one wire drawing treatment step, a second solution treatment step of forming a second solution treatment material 4 by forming a solid solution of the aluminum and the additive element in the obtained drawn material 3 obtained in the last wire drawing treatment step and then performing a quenching treatment, the second solution treatment step being performed immediately after the last wire drawing treatment step, and an aging treatment step which is performed after the second solution treatment step. In addition, in FIG. 2, the first solution treatment step, the last wire drawing treatment step, the second solution treatment step and the aging treatment step are performed at a first solution treatment part 101, a last wire drawing treatment part 102, a second solution treatment part 103 and an aging treatment part 104, respectively.

According to the above-mentioned manufacturing method of the aluminum alloy wire 10, the tensile strength and elongation of the obtained aluminum alloy wire 10 can be improved.

Next, the above-mentioned rough drawing wire formation step and the rough drawing wire treatment step will be described in detail.

<Rough Drawing Wire Formation Step>

The rough drawing wire formation step is a step of forming a rough drawing wire 1 composed of an aluminum alloy.

(Aluminum Alloy)

The aluminum alloy constituting the rough drawing wire 1 only has to contain at least Si and Mg as an additive element. However, the content of Si in the aluminum alloy is preferably mass % or more and 0.75 mass % or less. In this case, compared to a case where the content of Si is less than 0.35 mass %, in the aluminum alloy wire 10, the excellent tensile strength and elongation can be satisfied. Compared to a case where the content of Si is more than 0.75 mass %, the aluminum alloy wire 10 is more excellent in conductivity. The content of Si is preferably 0.45 mass % or more and 0.65 mass % or less, and more preferably 0.5 mass % or more and 0.6 mass % or less.

The content of Mg in the aluminum alloy is preferably 0.3 mass % or more and 0.7 mass % or less. In this case, compared to a case where the content of Mg is less than mass %, in the aluminum alloy wire 10, the excellent tensile strength and elongation can be satisfied. Compared to a case where the content of Mg is more than 0.7 mass %, the aluminum alloy wire 10 is more excellent in conductivity. The content of Mg is preferably 0.4 mass % or more and 0.6 mass % or less, and more preferably 0.45 mass % or more and 0.55 mass % or less.

The content of Cu in the aluminum alloy is preferably 0.4 mass % or less. In this case, compared to a case where the content of Cu is more than 0.4 mass %, the aluminum alloy wire 10 is excellent in conductivity. The content of Cu is preferably 0.3 mass % or less, and more preferably 0.2 mass % or less. However, the content of Cu in the aluminum alloy is preferably 0.1 mass % or more.

The content of Fe in the aluminum alloy is preferably 0.6 mass % or less. In this case, compared to a case where the content of Fe is more than 0.6 mass %, the aluminum alloy wire 10 is excellent in conductivity. The content of Fe is preferably 0.4 mass % or less, and more preferably 0.3 mass % or less. However, the content of Fe in the aluminum alloy is preferably 0.1 mass % or more.

The total content of Ti and V in the aluminum alloy is preferably 0.05 mass % or less. In this case, the aluminum alloy wire 10 is excellent in conductivity. The total content of Ti and V is preferably 0.03 mass % or less. The total content of Ti and V only have to be 0.05 mass % or less, and may be 0 mass %. That is, both the contents of Ti and V may be 0 mass %. Only the content of Ti out of Ti and V may be 0 mass %, and only the content of V may be 0 mass %. However, the total content of Ti and V is preferably 0.005 mass % or more.

Alternatively, the total content of Ti, V and B in the aluminum alloy is preferably 0.06 mass % or less. In this case, an aluminum alloy wire 10 is excellent in conductivity. The total content of Ti, V, and B only has to be 0.06 mass % or less, and may be 0 mass %. That is, all of the contents of Ti, V, and B may be 0 mass %. Further, only the content of the one or two element out of Ti, V, and B may be 0 mass %. However, the total content of Ti, V and B is preferably 0.010 mass % or more.

In addition, the contents of Si, Fe, Cu and Mg, and the total content of Ti and V use the mass of rough drawing wire 1 as a reference (100 mass %). The unavoidable impurities are different from the additive elements.

(Rough Drawing Wire)

The rough drawing wire 1 can be obtained, for example, by performing continuous casting rolling or hot extrusion after billet casting or the like on molten metal made of the above-mentioned aluminum alloy.

<Rough Drawing Wire Treatment Step>

The rough drawing wire treatment step is a step of obtaining the aluminum alloy wire 10 by performing a treatment step on the rough drawing wire 1.

As described above, the above-mentioned treatment step includes at least one wire drawing treatment step, a first solution treatment step of forming a first solution treatment material 2 by forming a solid solution of the aluminum and the additive element and then performing a quenching treatment, the first solution treatment step being performed immediately before the last wire drawing treatment step among the at least one wire drawing treatment step, a second solution treatment step of forming a second solution treatment material 4 by forming a solid solution of the aluminum and the additive element in the obtained drawn material 3 obtained in the last wire drawing treatment step and then performing a quenching treatment, the second solution treatment step being performed immediately after the last wire drawing treatment step, and an aging treatment step which is performed after the second solution treatment step.

Specific aspects of the procedure of the treatment step include, for example, the following ones:

(1) First solution treatment step→wire drawing treatment step→second solution treatment step→aging treatment step (2) Wire drawing treatment step→first solution treatment step→last wire drawing treatment step→second solution treatment step→aging treatment step (3) Wire drawing treatment step→normal heat treatment step→wire drawing treatment step→first solution treatment step→last wire drawing treatment step→second solution treatment step→aging treatment step Hereinafter, the wire drawing treatment step, the first solution treatment step, the second solution treatment step, and the aging treatment step will be described in detail.

<Wire Drawing Treatment Step>

The wire drawing treatment step is a step of reducing a diameter of the rough drawing wire 1, the first solution treatment material 2, a drawn wire material obtained by drawing the rough drawing wire 1, a drawn wire material obtained by further drawing the drawn wire material (hereinafter "rough drawing wire 1," "drawn wire material obtained by drawing the rough drawing wire 1" or "drawn wire material obtained by further drawing the drawn wire material" are referred to as "wire material") or the like. The wire drawing treatment step may be hot wire drawing or cold wire drawing, but is usually cold wire drawing.

The wire drawing treatment step may be performed a plurality of times or only once, but the wire drawing treatment step is preferably performed a plurality of times. The wire diameter of the drawn wire material 3 obtained in the last wire drawing treatment step among the wire drawing treatment steps (hereinafter referred to as a "final wire material 3") is not particularly limited, but the manufacturing method of one or more embodiments of the present invention is effective even in a case where the final wire diameter is 0.5 mm or less. However, the wire diameter of the final wire material 3 is preferably 0.1 mm or more.

<First Solution Treatment Step>

The first solution treatment step is a step which is performed immediately before the last wire drawing treatment step, and which forms the first solution treatment material 2 by forming a solid solution of aluminum and an additive element, and then performing a quenching treatment. Here, the formation of the solid solution is performed by heating the wire material to a higher temperature and performing a heating treatment to dissolve into the aluminum the additive which is not dissolved in the aluminum.

The quenching treatment is a rapid cooling treatment performed on the wire material after the solid solution is formed. The rapid cooling treatment of the wire material is performed in order to suppress precipitation of the additive element dissolved in the aluminum during cooling, compared to a case where the wire material is naturally cooled. Here, the rapid cooling means cooling at a cooling rate of 100 K/min or more.

In the first solution treatment step, the heat treatment temperature in forming a solid solution is not particularly limited as long as it is a temperature which can dissolve into the aluminum the additive element which is not dissolved in the aluminum, but it is preferably 450° C. or more. In this case, compared to a case where the heat treatment temperature is less than 450° C., the additive element can be more sufficiently dissolved into the aluminum. The heat treatment temperature in forming the solid solution is more preferably 500° C. or more. However, the heat treatment temperature in forming the solid solution is preferably 600° C. or less. In this case, compared to a case where the heat treatment temperature is higher than 600° C., the partial dissolution of the wire material can be suppressed more sufficiently. The heat treatment temperature in forming the solid solution is more preferably 550° C. or less.

The heat treatment time in forming the solid solution is not particularly limited, but, from the viewpoint of sufficiently dissolving into the aluminum the additive element which is not dissolved in the aluminum, it is preferably one hour or more. However, since the effect does not change much even if the heat treatment is performed for more than 5 hours. For this reason, the heat treatment time is preferably 5 hours or less to improve productivity.

The heat treatment time in forming the solid solution is preferably 2 to 4 hours.

In this case, compared to a case where the heat treatment time in forming the solid solution is out of the above range, the additive element which is not dissolved in the aluminum can be more sufficiently dissolved into the aluminum, and the productivity can be further improved.

The formation of the solid solution is preferably performed for a longer time than the time for forming the solid solution in the second solution treatment step.

In this case, compared to a case where the formation of the solid solution is performed in the first solution treatment step for a time which is not more than a time of forming a solid solution in the second solution treatment step, the tensile strength and elongation of the obtained aluminum alloy wire 10 are more remarkably improved.

The cooling rate of the wire material in the quenching treatment is not particularly limited as long as it is a cooling rate corresponding to rapid cooling. However, the cooling rate of the wire material is preferably 200 K/min or more. In this case, higher tensile strength and elongation can be obtained in the obtained aluminum alloy wire 10. The cooling rate of the wire material in the quenching treatment is preferably 500 K/min or more, and more preferably 700 K/min or more.

The rapid cooling can be performed using, for example, a liquid. As such a liquid, water or liquid nitrogen can be used.

<Second Solution Treatment Step>

The second solution treatment step is a step which is performed immediately after the last wire drawing treatment step in the treatment step, and which forms a second solution treatment material 4 by forming a solid solution of aluminum and an additive element in the final wire material 3 obtained in the last wire drawing treatment step. Here, the formation of the solid solution is performed by heating the final wire material 3 to a higher temperature and performing a heating treatment to dissolve into the aluminum the additive element which is not dissolved in the aluminum.

The quenching treatment is a rapid cooling treatment carried out on the final wire material 3 after forming a solid solution. The rapid cooling treatment of the final wire material 3 is performed in order to suppress precipitation of the additive element dissolved in the aluminum during cooling compared to a case of naturally cooling the final wire material 3. Here, the rapid cooling means cooling at a cooling rate of 100 K/min or more.

In the second solution treatment step, the heat treatment temperature in forming a solid solution is not particularly limited as long as it is a temperature which can dissolve into the aluminum the additive element which is not dissolved in the aluminum, but it is preferably 450° C. or more. In this case, the additive element can be dissolved into the aluminum compared to a case where the heat treatment temperature is less than 450° C. The heat treatment temperature in forming the solid solution is more preferably 500° C. or more. However, the heat treatment temperature in forming the solid solution is preferably 650° C. or less. In this case, compared to a case where the heat treatment temperature is higher than 650° C., the partial dissolution of the final wire material 3 can be suppressed more sufficiently. The heat treatment temperature in forming the solid solution is more preferably 600° C. or less. The heat treatment temperature in forming the solid solution may be the same as or different from the heat treatment temperature in the first solution treatment step.

The heat treatment time in forming the solid solution is not particularly limited, but it is preferably 3 hours or less, and more preferably 10 minutes or less. In this case, compared to a case where a heat treatment time in forming a solid solution exceeds 10 minutes, the tensile strength and elongation of the obtained aluminum alloy wire 10 can be further improved. However, it is preferable that the heat treatment time in forming the solid solution is longer than 10 seconds. In this case, in the obtained aluminum alloy wire 10, higher tensile strength and elongation can be obtained. The heat treatment time in forming the solid solution is preferably one minute or more.

The formation of the solid solution is preferably performed at a temperature of 500° C. to 600° C. for 10 minutes or less. In this case, tensile strength and elongation of the obtained aluminum alloy wire 10 can be more remarkably improved. The formation of the solid solution is preferably performed for one minute or less. In this case, tensile strength and elongation of the obtained aluminum alloy wire 10 can be more remarkably improved compared to a case where the formation of the solid solution is carried out for more than one minute in the second solution treatment step. However, the formation of the solid solution is performed at a temperature of 500° C. to 600° C. for a longer time than 10 seconds. In this case, higher tensile strength and elongation can be obtained in the obtained aluminum alloy wire 10.

The cooling rate of the final wire material 3 in the quenching treatment is not particularly limited as long as it is a cooling rate corresponding to rapid cooling. However, the cooling rate of the final wire material 3 is preferably 200 K/min or more. In this case, in the obtained aluminum alloy wire 10, higher tensile strength and elongation can be obtained. The cooling rate of the wire material in the quenching treatment is 500 K/min or more, and more preferably 700 K/min or more. The cooling rate in the quenching treatment in the second solution treatment step is the same as or different from the cooling rate in the quenching treatment in the first solution treatment step.

In addition, in the second solution treatment step, a solution treatment is performed on the final wire material, and the strain caused in the final wire material 3 in the last wire drawing treatment step can be removed.

<Aging Treatment Step>

The aging treatment step is a step which performs an aging treatment of the second solution treatment material 4 by forming precipitates in the aluminum alloy constituting the second solution treatment material 4. Specific examples of the precipitates include, for example, a compound containing an additive element (Si and Mg, for example). As the precipitates, $Mg_2Si$ is preferable. In this case, in the aging treatment step, the tensile strength of the obtained aluminum alloy wire 10 is more remarkably improved compared to a case where $Mg_2Si$ is not formed as a precipitate in the aluminum alloy constituting the second solution treatment material 4 obtained in the second solution treatment step.

In the aging treatment step, it is preferable to perform a heat treatment of the second solution treatment material 4 at 300° C. or less. In this case, the tensile strength and elongation of the obtained aluminum alloy wire 10 can be further improved compared to a case where the heat treatment temperature exceeds 300° C. In the aging treatment step, it is more preferable to perform a heat treatment of the second solution treatment material 4 at 200° C. or less, and is furthermore preferable to perform a heat treatment of the second solution treatment material 4 at 150° C. or less. In this case, the tensile strength and elongation of the obtained aluminum alloy wire 10 can be further improved compared to a case where the heat treatment temperature is out of each of the above-mentioned ranges. However, the heat treatment temperature of the second solution treatment material 4 in the aging treatment step is preferably 120° C. or more. In this case, compared to a case where the heat treatment temperature is less than 120° C., the aging hardening of the second solution treatment material 4 can be efficiently performed in a short time.

The heat treatment time in the aging treatment step is preferably 3 hours or more. In this case, compared to a case where the heat treatment of the second solution treatment material 4 is performed for less than 3 hours, the elongation and the conductivity are further improved in the aluminum alloy wire 10. However, the heat treatment time is preferably 24 hours or less, and preferably 18 hours or less.

<Others>

In a case of performing the wire drawing treatment step before the first solution treatment step, the above-mentioned treatment step preferably includes a normal heat treatment step of performing a heat treatment of the wire material between the wire drawing treatment step and the first solution treatment step. In this case, the strain caused in the wire drawing treatment step can be removed by the normal heat treatment step. Here, the normal heat treatment step means a heat treatment step in which a solution treatment is not performed (non-solution treatment step), specifically, a step which performs slow cooling (natural cooling, for example) after performing a heat treatment of the wire material. The slow cooling means cooling at a cooling rate of less than 100 K/min.

The heat treatment temperature in the normal heat treatment step is not particularly limited, but is usually 100° C. to 400° C. and preferably 200° C. to 400° C.

Further, the heat treatment time in the normal heat treatment step cannot be determined unconditionally since it depends on the heat treatment temperature as well, but it is usually 1 to 20 hours.

[Method of Manufacturing an Electric Wire]

Figure 3:
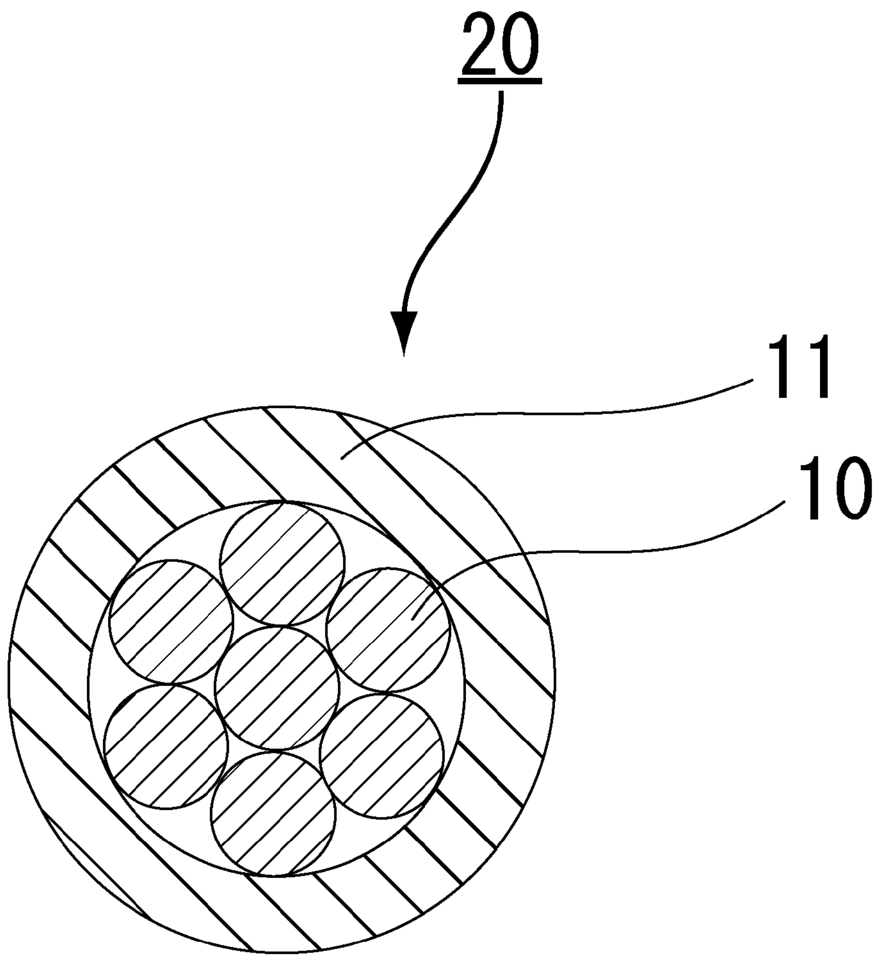
FIG. 3 is a cross-sectional view showing an example of an electric wire obtained by a method of manufacturing an electric wire according to one or more embodiments of the present invention.

Next, a method of manufacturing an electric wire of one or more embodiments of the present invention will be described with reference to FIG. 3. FIG. 3 is a cross-sectional view showing an example of an electric wire obtained by a method of manufacturing an electric wire of one or more embodiments of the present invention.

As shown in FIG. 3, the electric wire 20 includes the above-mentioned aluminum alloy wire 10 and a coating layer 11 coating the aluminum alloy wire 10.

The manufacturing method of the electric wire 20 includes an aluminum alloy wire preparation step of preparing the aluminum alloy wire 10 by the manufacturing method of the above-mentioned aluminum alloy wire 10 and an electric wire manufacturing step of coating the aluminum alloy wire 10 with the coating layer 11 to manufacture the electric wire 20.

According to the manufacturing method of the electric wire 20, tensile strength and elongation of the obtained aluminum alloy wire 10 can be improved by the aluminum alloy wire preparation step. For this reason, the electric wire 20 obtained by coating such an aluminum alloy wire 10 with the coating layer 11 is useful as an electric wire disposed at a dynamic part in which bending or vibration is applied (for example, a door part of an automobile or in the vicinity of an engine of an automobile).

<Aluminum Alloy Wire Preparation Step>

The aluminum alloy wire preparation step is a step of preparing the aluminum alloy wire 10 by the above-mentioned manufacturing method of the aluminum alloy wire 10.

<Electric Wire Manufacturing Step>

The electric wire manufacturing step is a step of manufacturing the electric wire 20 by coating the aluminum alloy wire 10 prepared in the aluminum alloy wire preparation step with the coating layer 11.

(Coating Layer)

The coating layer 11 is not particularly limited, but, for example, is composed of an insulating material such as a polyvinyl chloride resin, or a flame retardant resin composition obtained by adding a flame retardant or the like to a polyolefin resin.

The thickness of the coating layer 11 is not particularly limited, but is, for example, 0.1 mm to 1 mm.

The method of coating the aluminum alloy wire 10 with the coating layer 11 is not particularly limited, but, its specific examples include, for example, a method of winding the coating layer 11 molded into a tape shape on the aluminum alloy wire 10; and a method of extrusion-coating the coating layer 11 on the aluminum alloy wire 10.

[Method of Manufacturing Wire Harness]

Figure 4:
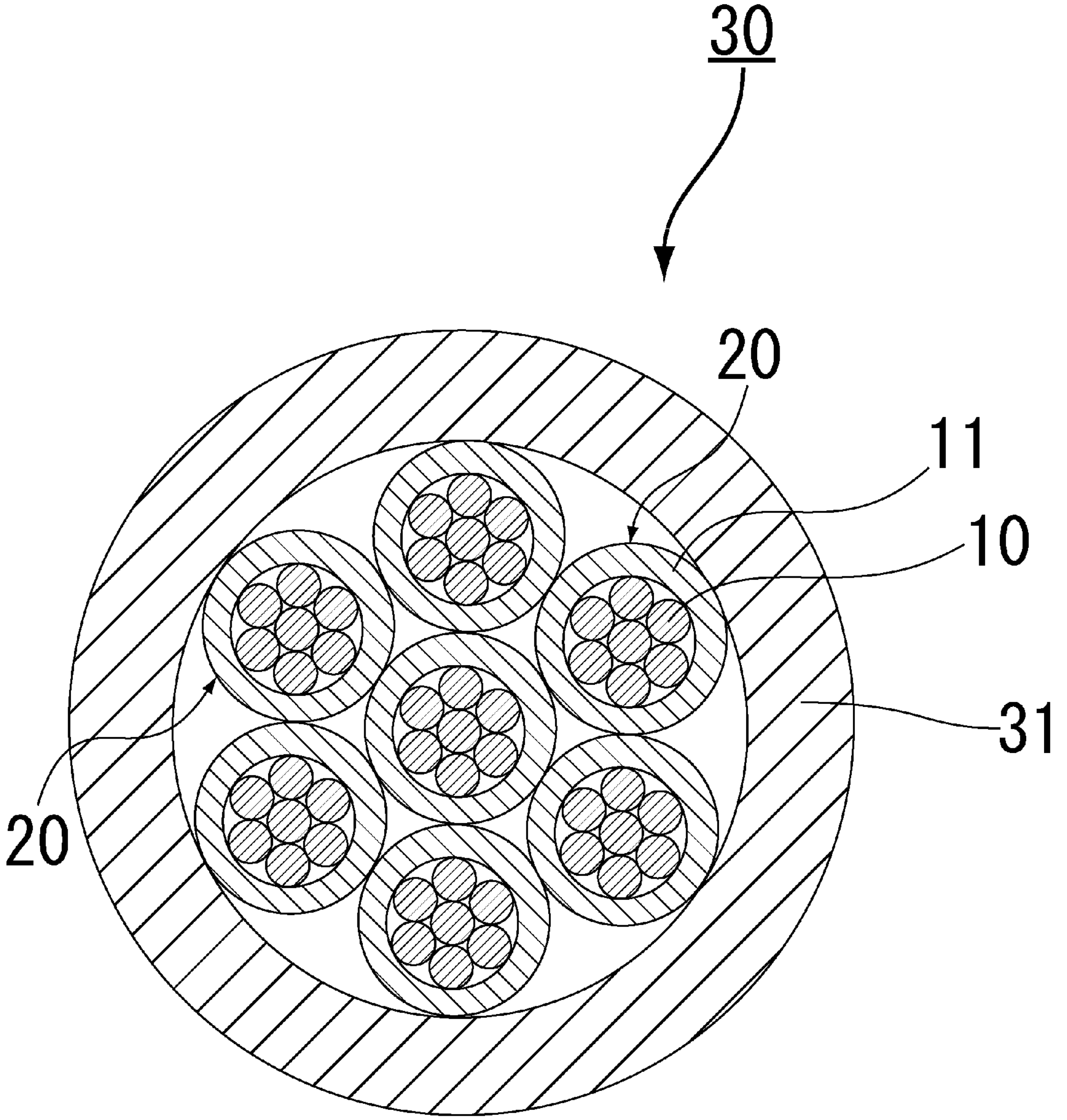
FIG. 4 is a cross-sectional view showing an example of a wire harness obtained by a method of manufacturing a wire harness of one or more embodiments of the present invention.

Next, a method of manufacturing a wire harness of one or more embodiments of the present invention will be described with reference to FIG. 4. FIG. 4 is a cross-sectional view showing an example of a wire harness obtained by a method of manufacturing a wire harness of one or more embodiments of the present invention.

As shown in FIG. 4, a wire harness 30 includes a plurality of the above-mentioned electric wires 20. The wire harness 30 may further include a tape 31 for bundling the above-mentioned electric wire 20 if needed, for example.

The method of manufacturing the wire harness 30 includes an electric wire preparation step of preparing the electric wire 20 by the above-mentioned manufacturing method of the electric wire 20; and a wire harness manufacturing step of manufacturing the wire harness 30 by using a plurality of the electric wire 20.

According to the manufacturing method of the wire harness 30, tensile strength and elongation of the obtained aluminum alloy wire 10 can be improved by the aluminum alloy wire preparation step included in the electric wire preparation step. For this reason, the wire harness 30 including the electric wire 20 obtained by coating such an aluminum alloy wire 10 with the coating layer 11 is useful as a wire harness disposed at a dynamic part in which bending or vibration is applied (for example, a door part of an automobile or in the vicinity of an engine of an automobile).

<Wire Harness Manufacturing Step>

The wire harness manufacturing step is a step of manufacturing the wire harness 30 by using a plurality of electric wires 20 prepared in the electric wire preparation step.

In the wire harness manufacturing step, all of the electric wires 20 may have different wire diameters or may have the same wire diameter.

Further, in the wire harness manufacturing step, all of the electric wires 20 may be composed of an aluminum alloy having a different composition or may be composed of an aluminum alloy having the same composition.

The number of the electric wires 20 used in the wire harness manufacturing step is not particularly limited as long as it is two or more, but is preferably 200 or less.

In the wire harness manufacturing step, the electric wire 20 may be bundled using a tape 31 if needed. The tape 31 can be composed of the same material as that of the coating layer 11. In addition, a tube may be used in place of the tape 31.

EXAMPLES

Hereinafter, the contents of one or more embodiments of the present invention will be described more specifically with reference to Examples and Comparative Examples, but one or more embodiments of the present invention is not limited to the following examples.

Examples 1 to 26 and Comparative Examples 1 to 26

An aluminum alloy having a wire diameter of 25 mm was cast by dissolving Si, Fe, Cu, Mg, Ti, V and B together with aluminum such that contents (unit: mass %) shown in Table 1 and 2 are obtained, and then pouring into a mold having a diameter of 25 mm. Then, a rough drawing wire having a wire diameter of 9.5 mm was obtained by performing a swaging processing on thus obtained aluminum alloy with a swaging machine (manufactured by Yoshida Kinen Co., Ltd.) such that a diameter of 9.5 mm was obtained and then performing a heat treatment at 270° C. for 8 hours. An aluminum alloy conductive wire was obtained by performing the following treatment steps shown in Tables 1 and 2 of the following treatment steps A1 to A9 and B1 to B9 on thus obtained rough drawing wire.

In addition, in Tables 1 and 2, the type of the treatment step, the wire diameter immediately before the last wire drawing treatment step, the type and condition of the heat treatment immediately before the last wire drawing treatment step, the condition of the solution treatment immediately after the last wire drawing treatment step and the condition of the aging treatment were also shown.

Further, in the first solution treatment step immediately before the last wire drawing treatment step of the following treatment steps A1 to A9, after forming a solid solution of aluminum and an additive element, a quenching treatment by water cooling was performed. The cooling rate of the quenching treatment at this time was 800 K/min. Moreover, in the solution treatment step immediately after the last wire drawing treatment step of the following treatment steps A1 to A9 and B1 to B9 as well, after forming a solid solution of aluminum and an additive element, a quenching treatment by water cooling was performed. The cooling rate of the quenching treatment at this time was 800 K/min. Further, "normal heat treatment" in the following treatment steps A1 to A9 and B1 to B9 refers to a heat treatment which is not a solution treatment.

(Treatment Step A1)

Wire drawing to a wire diameter of 3.1 mm (wire drawing treatment step)

Normal heat treatment at 270° C.×8 hours (non-solution treatment step)

Wire drawing to a wire diameter of 1.2 mm (wire drawing treatment step)

Solution treatment at 550° C.×3 hours (first solution treatment step)

Wire drawing to a wire diameter of 0.33 mm (last wire drawing treatment step)

Solution treatment at 550° C.×3 hours (second solution treatment step)

Aging treatment at 150° C.×8 hours (aging treatment step)

(Treatment Step A2)

Wire drawing to a wire diameter of 3.1 mm (wire drawing treatment step)

Normal heat treatment at 270° C.×8 hours (non-solution treatment step)

Wire drawing to a wire diameter of 1.2 mm (wire drawing treatment step)

Solution treatment at 550° C.×3 hours (first solution treatment step)

Wire drawing to a wire diameter of 0.33 mm (last wire drawing treatment step)

Solution treatment at 550° C.×1 minute (second solution treatment step)

Aging treatment at 150° C.×8 hours (aging treatment step)

(Treatment Step A3)

Wire drawing to a wire diameter of 3.1 mm (wire drawing treatment step)

Normal heat treatment at 270° C.×8 hours (non-solution treatment step)

Wire drawing to a wire diameter of 1.0 mm (wire drawing treatment step)

Solution treatment at 530° C.×3 hours (first solution treatment step)

Wire drawing to a wire diameter of 0.33 mm (last wire drawing treatment step)

Solution treatment at 550° C.×3 hours (second solution treatment step)

Aging treatment at 150° C.×8 hours (aging treatment step)

(Treatment Step A4)

Wire drawing to a wire diameter of 3.1 mm (wire drawing treatment step)

Normal heat treatment at 270° C.×8 hours (non-solution treatment step)

Wire drawing to a wire diameter of 1.0 mm (wire drawing treatment step)

Solution treatment at 530° C.×3 hours (first solution treatment step)

Wire drawing to a wire diameter of 0.33 mm (wire drawing treatment step)

Solution treatment at 550° C.×1 minute (second solution treatment step)

Aging treatment at 150° C.×8 hours (aging treatment step)

(Treatment Step A5)

Wire drawing to a wire diameter of 3.1 mm (wire drawing treatment step)

Normal heat treatment at 270° C.×8 hours (non-solution treatment step)

Wire drawing to a wire diameter of 1.2 mm (wire drawing treatment step)

Solution treatment at 550° C.×3 hours (first solution treatment step)

Wire drawing to a wire diameter of 0.33 mm (last wire drawing treatment step)

Solution treatment at 550° C.×1 minute (second solution treatment step)

Aging treatment at 140° C.×8 hours (aging treatment step)

(Treatment Step A6)

Wire drawing to a wire diameter of 3.1 mm (wire drawing treatment step)

Normal heat treatment at 270° C.×8 hours (non-solution treatment step)

Wire drawing to a wire diameter of 1.2 mm (wire drawing treatment step)

Solution treatment at 550° C.×3 hours (first solution treatment step)

Wire drawing to a wire diameter of 0.33 mm (last wire drawing treatment step)

Solution treatment at 550° C.×1 minute (second solution treatment step)

Aging treatment at 120° C.×24 hours (aging treatment step)

(Treatment Step A7)

Wire drawing to a wire diameter of 3.1 mm (wire drawing treatment step)

Normal heat treatment at 270° C.×8 hours (non-solution treatment step)

Wire drawing to a wire diameter of 1.2 mm (wire drawing treatment step)

Solution treatment at 550° C.×3 hours (first solution treatment step)

Wire drawing to a wire diameter of 0.33 mm (last wire drawing treatment step)

Solution treatment at 550° C.×4 seconds (second solution treatment step)

Aging treatment at 140° C.×8 hours (aging treatment step)

(Treatment Step A8)

Wire drawing to a wire diameter of 3.1 mm (wire drawing treatment step)

Normal heat treatment at 270° C.×8 hours (non-solution treatment step)

Wire drawing to a wire diameter of 1.2 mm (wire drawing treatment step)

Solution treatment at 550° C.×3 hours (first solution treatment step)

Wire drawing to a wire diameter of 0.33 mm (last wire drawing treatment step)

Solution treatment at 550° C.×12 seconds (second solution treatment step)

Aging treatment at 140° C.×8 hours (aging treatment step)

(Treatment Step A9)

Wire drawing to a wire diameter of 3.1 mm (wire drawing treatment step)

Normal heat treatment at 270° C.×8 hours (non-solution treatment step)

Wire drawing to a wire diameter of 1.2 mm (wire drawing treatment step)

Solution treatment at 550° C.×3 hours (first solution treatment step)

Wire drawing to a wire diameter of 0.33 mm (last wire drawing treatment step)

Solution treatment at 550° C.×8 minutes (second solution treatment step)

Aging treatment at 140° C.×8 hours (aging treatment step)

(Treatment Step B1)

Wire drawing to a wire diameter of 3.1 mm (wire drawing treatment step)

Normal heat treatment at 270° C.×8 hours (non-solution treatment step)

Wire drawing to a wire diameter of 1.2 mm (wire drawing treatment step)

Normal heat treatment at 270° C.×8 hours (non-solution treatment step)

Wire drawing to a wire diameter of 0.33 mm (last wire drawing treatment step)

Solution treatment at 550° C.×3 hours

Aging treatment at 150° C.×8 hours (aging treatment step)

(Treatment Step B2)

Wire drawing to a wire diameter of 3.1 mm (wire drawing treatment step)

Normal heat treatment at 270° C.×8 hours (non-solution treatment step)

Wire drawing to a wire diameter of 1.2 mm (wire drawing treatment step)

Normal heat treatment at 270° C.×8 hours (non-solution treatment step)

Wire drawing to a wire diameter of 0.33 mm (last wire drawing treatment step)

Solution treatment at 550° C.×1 minute

Aging treatment at 150° C.×8 hours (aging treatment step)

(Treatment Step B3)

Wire drawing to a wire diameter of 3.1 mm (wire drawing treatment step)

Normal heat treatment at 270° C.×8 hours (non-solution treatment step)

Wire drawing to a wire diameter of 1.0 mm (wire drawing treatment step)

Normal heat treatment at 270° C.×8 hours (non-solution treatment step)

Wire drawing to a wire diameter of 0.33 mm (last wire drawing treatment step)

Solution treatment at 550° C.×3 hours

Aging treatment at 150° C.×8 hours (aging treatment step)

(Treatment Step B4)

Wire drawing to a wire diameter of 3.1 mm (wire drawing treatment step)

Normal heat treatment at 270° C.×8 hours (non-solution treatment step)

Wire drawing to a wire diameter of 1.0 mm (wire drawing treatment step)

Normal heat treatment at 270° C.×8 hours (non-solution treatment step)

Wire drawing to a wire diameter of 0.33 mm (last wire drawing treatment step)

Solution treatment at 550° C.×1 minute

Aging treatment at 150° C.×8 hours (aging treatment step)

(Treatment Step B5)

Wire drawing to a wire diameter of 3.1 mm (wire drawing treatment step)

Normal heat treatment at 270° C.×8 hours (non-solution treatment step)

Wire drawing to a wire diameter of 1.2 mm (wire drawing treatment step)
Normal heat treatment at 270° C.×8 hours (non-solution treatment step)
Wire drawing to a wire diameter of 0.33 mm (last wire drawing treatment step)
Solution treatment at 550° C.×1 minute
Aging treatment at 140° C.×8 hours (aging treatment step)
(Treatment Step B6)
Wire drawing to a wire diameter of 3.1 mm (wire drawing treatment step)
Normal heat treatment at 270° C.×8 hours (non-solution treatment step)
Wire drawing to a wire diameter of 1.2 mm (wire drawing treatment step)
Normal heat treatment at 270° C.×8 hours (non-solution treatment step)
Wire drawing to a wire diameter of 0.33 mm (last wire drawing treatment step)
Solution treatment at 550° C.×1 minute
Aging treatment at 120° C.×24 hours (aging treatment step)
(Treatment Step B7)
Wire drawing to a wire diameter of 3.1 mm (wire drawing treatment step)
Normal heat treatment at 270° C.×8 hours (non-solution treatment step)
Wire drawing to a wire diameter of 1.2 mm (wire drawing treatment step)
Normal heat treatment at 270° C.×8 hours (non-solution treatment step)
Wire drawing to a wire diameter of 0.33 mm (last wire drawing treatment step)
Solution treatment at 550° C.×4 seconds
Aging treatment at 150° C.×8 hours (aging treatment step)
(Treatment Step B8)
Wire drawing to a wire diameter of 3.1 mm (wire drawing treatment step)
Normal heat treatment at 270° C.×8 hours (non-solution treatment step)
Wire drawing to a wire diameter of 1.2 mm (wire drawing treatment step)
Normal heat treatment at 270° C.×8 hours (non-solution treatment step)
Wire drawing to a wire diameter of 0.33 mm (last wire drawing treatment step)
Solution treatment at 550° C.×12 seconds
Aging treatment at 150° C.×8 hours (aging treatment step)
(Treatment Step B9)
Wire drawing to a wire diameter of 3.1 mm (wire drawing treatment step)
Normal heat treatment at 270° C.×8 hours (non-solution treatment step)
Wire drawing to a wire diameter of 1.2 mm (wire drawing treatment step)
Normal heat treatment at 270° C.×8 hours (non-solution treatment step)
Wire drawing to a wire diameter of 0.33 mm (last wire drawing treatment step)
Solution treatment at 550° C.×8 minutes
Aging treatment at 150° C.×8 hours (aging treatment step
[Characteristic Evaluation]
(Tensile Strength and Elongation)

For the aluminum alloy wires of Examples 1 to 26 and Comparative Examples 1 to 26, tensile strength and elongation were measured by a tensile test according to JIS C3002. The results are shown in Tables 1 and 2.

With the tensile strength and elongation of Comparative Examples 1 to 26 set to 100, relative values of tensile strength and elongation of Examples 1 to 26 to Comparative Examples 1 to 26 were also shown. Here, the relative values of the tensile strength and elongation of the Examples 1 to 26 are relative values when the tensile strength and elongation of Comparative Examples located directly below the Examples in Tables 1 and 2 were set to 100, respectively. The results are shown in Tables 1 and 2.

TABLE 1

| | Composition (Unit: mass %) | | | | | | | | |
|---|---|---|---|---|---|---|---|---|---|
| | Si | Fe | Mg | Cu | Ti | V | B | Ti + V + B | Al and inevitable impurities |
| Example 1 | 0.57 | 0.21 | 0.53 | 0.04 | 0.018 | 0.003 | 0 | 0.021 | balance |
| Comparative Example 1 | 0.57 | 0.21 | 0.53 | 0.04 | 0.018 | 0.003 | 0 | 0.021 | balance |
| Example 2 | 0.57 | 0.21 | 0.53 | 0.04 | 0.018 | 0.003 | 0 | 0.021 | balance |
| Comparative Example 2 | 0.57 | 0.21 | 0.53 | 0.04 | 0.018 | 0.003 | 0 | 0.021 | balance |
| Example 3 | 0.57 | 0.21 | 0.53 | 0.04 | 0.018 | 0.003 | 0 | 0.021 | balance |
| Comparative Example 3 | 0.57 | 0.21 | 0.53 | 0.04 | 0.018 | 0.003 | 0 | 0.021 | balance |
| Example 4 | 0.57 | 0.21 | 0.53 | 0.04 | 0.018 | 0.003 | 0 | 0.021 | balance |
| Comparative Example 4 | 0.57 | 0.21 | 0.53 | 0.04 | 0.018 | 0.003 | 0 | 0.021 | balance |
| Example 5 | 0.46 | 0.15 | 0.59 | 0.01 | 0.013 | 0.005 | 0 | 0.018 | balance |
| Comparative Example 5 | 0.46 | 0.15 | 0.59 | 0.01 | 0.013 | 0.005 | 0 | 0.018 | balance |
| Example 6 | 0.46 | 0.15 | 0.59 | 0.01 | 0.013 | 0.005 | 0 | 0.018 | balance |
| Comparative Example 6 | 0.46 | 0.15 | 0.59 | 0.01 | 0.013 | 0.005 | 0 | 0.018 | balance |
| Example 7 | 0.62 | 0.24 | 0.52 | 0.05 | 0.020 | 0.007 | 0 | 0.027 | balance |
| Comparative Example 7 | 0.62 | 0.24 | 0.52 | 0.05 | 0.020 | 0.007 | 0 | 0.027 | balance |
| Example 8 | 0.56 | 0.18 | 0.43 | 0.07 | 0.016 | 0.004 | 0 | 0.020 | balance |
| Comparative Example 8 | 0.56 | 0.18 | 0.43 | 0.07 | 0.016 | 0.004 | 0 | 0.020 | balance |
| Example 9 | 0.53 | 0.36 | 0.55 | 0.03 | 0.022 | 0.004 | 0 | 0.026 | balance |

TABLE 1-continued

| | | | | | | | | | |
|---|---|---|---|---|---|---|---|---|---|
| Comparative Example 9 | 0.53 | 0.36 | 0.55 | 0.03 | 0.022 | 0.004 | 0 | 0.026 | balance |
| Example 10 | 0.55 | 0 | 0.55 | 0.06 | 0.010 | 0 | 0 | 0.010 | balance |
| Comparative Example 10 | 0.55 | 0 | 0.55 | 0.06 | 0.010 | 0 | 0 | 0.010 | balance |
| Example 11 | 0.58 | 0.26 | 0.5 | 0.27 | 0.029 | 0.014 | 0 | 0.043 | balance |
| Comparative Example 11 | 0.58 | 0.26 | 0.5 | 0.27 | 0.029 | 0.014 | 0 | 0.043 | balance |
| Example 12 | 0.54 | 0.19 | 0.51 | 0 | 0.022 | 0.006 | 0 | 0.028 | balance |
| Comparative Example 12 | 0.54 | 0.19 | 0.51 | 0 | 0.022 | 0.006 | 0 | 0.028 | balance |
| Example 13 | 0.55 | 0.2 | 0.54 | 0.03 | 0 | 0 | 0 | 0 | balance |
| Comparative Example 13 | 0.55 | 0.2 | 0.54 | 0.03 | 0 | 0 | 0 | 0 | balance |

| | Type of treatment step | Wire diameter immediately before last wire drawing treatment step (mm) | Type and condition of heat treatment immediately before last wire drawing treatment step: Type | Condition |
|---|---|---|---|---|
| Example 1 | A1 | 1.2 | Solution Treatment | 550° C. × 3 h |
| Comparative Example 1 | B1 | 1.2 | Normal Heat Treatment | 270° C. × 8 h |
| Example 2 | A2 | 1.2 | Solution Treatment | 550° C. × 3 h |
| Comparative Example 2 | B2 | 1.2 | Normal Heat Treatment | 270° C. × 8 h |
| Example 3 | A3 | 1.0 | Solution Treatment | 530° C. × 3 h |
| Comparative Example 3 | B3 | 1.0 | Normal Heat Treatment | 270° C. × 8 h |
| Example 4 | A4 | 1.0 | Solution Treatment | 530° C. × 3 h |
| Comparative Example 4 | B4 | 1.0 | Normal Heat Treatment | 270° C. × 8 h |
| Example 5 | A1 | 1.2 | Solution Treatment | 550° C. × 3 h |
| Comparative Example 5 | B1 | 1.2 | Normal Heat Treatment | 270° C. × 8 h |
| Example 6 | A2 | 1.2 | Solution Treatment | 550° C. × 3 h |
| Comparative Example 6 | B2 | 1.2 | Normal Heat Treatment | 270° C. × 8 h |
| Example 7 | A5 | 1.2 | Solution Treatment | 550° C. × 3 h |
| Comparative Example 7 | B5 | 1.2 | Normal Heat Treatment | 270° C. × 8 h |
| Example 8 | A5 | 1.2 | Solution Treatment | 550° C. × 3 h |
| Comparative Example 8 | B5 | 1.2 | Normal Heat Treatment | 270° C. × 8 h |
| Example 9 | A5 | 1.2 | Solution Treatment | 550° C. × 3 h |
| Comparative Example 9 | B5 | 1.2 | Normal Heat Treatment | 270° C. × 8 h |
| Example 10 | A5 | 1.2 | Solution Treatment | 550° C. × 3 h |
| Comparative Example 10 | B5 | 1.2 | Normal Heat Treatment | 270° C. × 8 h |
| Example 11 | A5 | 1.2 | Solution Treatment | 550° C. × 3 h |
| Comparative Example 11 | B5 | 1.2 | Normal Heat Treatment | 270° C. × 8 h |
| Example 12 | A5 | 1.2 | Solution Treatment | 550° C. × 3 h |
| Comparative Example 12 | B5 | 1.2 | Normal Heat Treatment | 270° C. × 8 h |
| Example 13 | A2 | 1.2 | Solution Treatment | 550° C. × 3 h |
| Comparative Example 13 | B2 | 1.2 | Normal Heat Treatment | 270° C. × 8 h |

| | Condition of Solution Treatment Step immediately after last wire drawing treatment | Condition of Aging treatment | Tensile Strength (MPa) | Tensile Strength (Relative Value) | Elongation (%) | Elongation (Relative Value) |
|---|---|---|---|---|---|---|
| Example 1 | 550° C. × 3 h | 150° C. × 8 h | 216 | 125 | 11.8 | 257 |
| Comparative Example 1 | 550° C. × 3 h | 150° C. × 8 h | 173 | 100 | 4.6 | 100 |
| Example 2 | 550° C. × 1 min | 150° C. × 8 h | 240 | 102 | 15.2 | 475 |
| Comparative Example 2 | 550° C. × 1 min | 150° C. × 8 h | 235 | 100 | 3.2 | 100 |
| Example 3 | 550° C. × 3 h | 150° C. × 8 h | 218 | 127 | 10.0 | 238 |
| Comparative Example 3 | 550° C. × 3 h | 150° C. × 8 h | 172 | 100 | 4.2 | 100 |

TABLE 1-continued

| | | | | | | |
|---|---|---|---|---|---|---|
| Example 4 | 550° C. × 1 min | 150° C. × 8 h | 244 | 105 | 14.8 | 389 |
| Comparative Example 4 | 550° C. × 1 min | 150° C. × 8 h | 233 | 100 | 3.8 | 100 |
| Example 5 | 550° C. × 3 h | 150° C. × 8 h | 208 | 132 | 10.4 | 289 |
| Comparative Example 5 | 550° C. × 3 h | 150° C. × 8 h | 158 | 100 | 3.6 | 100 |
| Example 6 | 550° C. × 1 min | 150° C. × 8 h | 227 | 121 | 14.0 | 467 |
| Comparative Example 6 | 550° C. × 1 min | 150° C. × 8 h | 187 | 100 | 3.0 | 100 |
| Example 7 | 550° C. × 1 min | 140° C. × 8 h | 243 | 123 | 13.2 | 338 |
| Comparative Example 7 | 550° C. × 1 min | 140° C. × 8 h | 198 | 100 | 3.9 | 100 |
| Example 8 | 550° C. × 1 min | 140° C. × 8 h | 232 | 123 | 12.8 | 312 |
| Comparative Example 8 | 550° C. × 1 min | 140° C. × 8 h | 188 | 100 | 4.1 | 100 |
| Example 9 | 550° C. × 1 min | 140° C. × 8 h | 241 | 115 | 13.5 | 276 |
| Comparative Example 9 | 550° C. × 1 min | 140° C. × 8 h | 209 | 100 | 4.9 | 100 |
| Example 10 | 550° C. × 1 min | 140° C. × 8 h | 240 | 120 | 12.4 | 443 |
| Comparative Example 10 | 550° C. × 1 min | 140° C. × 8 h | 200 | 100 | 2.8 | 100 |
| Example 11 | 550° C. × 1 min | 140° C. × 8 h | 260 | 119 | 13.0 | 271 |
| Comparative Example 11 | 550° C. × 1 min | 140° C. × 8 h | 219 | 100 | 4.8 | 100 |
| Example 12 | 550° C. × 1 min | 140° C. × 8 h | 236 | 119 | 13.6 | 439 |
| Comparative Example 12 | 550° C. × 1 min | 140° C. × 8 h | 198 | 100 | 3.1 | 100 |
| Example 13 | 550° C. × 1 min | 150° C. × 8 h | 241 | 105 | 14.6 | 356 |
| Comparative Example 13 | 550° C. × 1 min | 150° C. × 8 h | 229 | 100 | 4.1 | 100 |

TABLE 2

| | Composition (Unit: mass %) | | | | | | | | |
|---|---|---|---|---|---|---|---|---|---|
| | Si | Fe | Mg | Cu | Ti | V | B | Ti + V + B | Al and inevitable impurities |
| Example 14 | 0.57 | 0.21 | 0.53 | 0.04 | 0.018 | 0.003 | 0 | 0.021 | balance |
| Comparative Example 14 | 0.57 | 0.21 | 0.53 | 0.04 | 0.018 | 0.003 | 0 | 0.021 | balance |
| Example 15 | 0.57 | 0.21 | 0.53 | 0.04 | 0.018 | 0.003 | 0 | 0.021 | balance |
| Comparative Example 15 | 0.57 | 0.21 | 0.53 | 0.04 | 0.018 | 0.003 | 0 | 0.021 | balance |
| Example 16 | 0.57 | 0.21 | 0.53 | 0.04 | 0.018 | 0.003 | 0 | 0.021 | balance |
| Comparative Example 16 | 0.57 | 0.21 | 0.53 | 0.04 | 0.018 | 0.003 | 0 | 0.021 | balance |
| Example 17 | 0.57 | 0.21 | 0.53 | 0.04 | 0.018 | 0.003 | 0 | 0.021 | balance |
| Comparative Example 17 | 0.57 | 0.21 | 0.53 | 0.04 | 0.018 | 0.003 | 0 | 0.021 | balance |
| Example 18 | 0.72 | 0.17 | 0.48 | 0.02 | 0.015 | 0.003 | 0 | 0.018 | balance |
| Comparative Example 18 | 0.72 | 0.17 | 0.48 | 0.02 | 0.015 | 0.003 | 0 | 0.018 | balance |
| Example 19 | 0.38 | 0.23 | 0.52 | 0.06 | 0.011 | 0.002 | 0 | 0.013 | balance |
| Comparative Example 19 | 0.38 | 0.23 | 0.52 | 0.06 | 0.011 | 0.002 | 0 | 0.013 | balance |
| Example 20 | 0.51 | 0.58 | 0.53 | 0.03 | 0.021 | 0.006 | 0 | 0.027 | balance |
| Comparative Example 21 | 0.51 | 0.58 | 0.53 | 0.03 | 0.021 | 0.006 | 0 | 0.027 | balance |
| Example 21 | 0.56 | 0.19 | 0.68 | 0.02 | 0.009 | 0.002 | 0 | 0.011 | balance |
| Comparative Example 21 | 0.56 | 0.19 | 0.68 | 0.02 | 0.009 | 0.002 | 0 | 0.011 | balance |
| Example 22 | 0.54 | 0.17 | 0.31 | 0.12 | 0.023 | 0.004 | 0 | 0.027 | balance |
| Comparative Example 22 | 0.54 | 0.17 | 0.31 | 0.12 | 0.023 | 0.004 | 0 | 0.027 | balance |
| Example 23 | 0.56 | 0.22 | 0.47 | 0.36 | 0.020 | 0.005 | 0 | 0.025 | balance |
| Comparative Example 23 | 0.56 | 0.22 | 0.47 | 0.36 | 0.020 | 0.005 | 0 | 0.025 | balance |
| Example 24 | 0.55 | 0.20 | 0.50 | 0.05 | 0.045 | 0 | 0 | 0.045 | balance |
| Comparative Example 24 | 0.55 | 0.20 | 0.50 | 0.05 | 0.045 | 0 | 0 | 0.045 | balance |

TABLE 2-continued

| | | | | | | | | | |
|---|---|---|---|---|---|---|---|---|---|
| Example 25 | 0.56 | 0.18 | 0.50 | 0.05 | 0.019 | 0 | 0.008 | 0.027 | balance |
| Comparative Example 25 | 0.56 | 0.18 | 0.50 | 0.05 | 0.019 | 0 | 0.008 | 0.027 | balance |
| Example 26 | 0.53 | 0.20 | 0.49 | 0.05 | 0.041 | 0.015 | 0 | 0.056 | balance |
| Comparative Example 26 | 0.53 | 0.20 | 0.49 | 0.05 | 0.041 | 0.015 | 0 | 0.056 | balance |

| | Type of treatment step | Wire diameter immediately before last wire drawing treatment step (mm) | Type and condition of heat treatment immediately before last wire drawing treatment step | |
|---|---|---|---|---|
| | | | Type | Condition |
| Example 14 | A6 | 1.2 | Solution Treatment | 550° C. × 3 h |
| Comparative Example 14 | B6 | 1.2 | Normal Heat Treatment | 270° C. × 8 h |
| Example 15 | A7 | 1.2 | Solution Treatment | 550° C. × 3 h |
| Comparative Example 15 | B7 | 1.2 | Normal Heat Treatment | 270° C. × 8 h |
| Example 16 | A8 | 1.2 | Solution Treatment | 550° C. × 3 h |
| Comparative Example 16 | B8 | 1.2 | Normal Heat Treatment | 270° C. × 8 h |
| Example 17 | A9 | 1.2 | Solution Treatment | 550° C. × 3 h |
| Comparative Example 17 | B9 | 1.2 | Normal Heat Treatment | 270° C. × 8 h |
| Example 18 | A2 | 1.2 | Solution Treatment | 550° C. × 3 h |
| Comparative Example 18 | B2 | 1.2 | Normal Heat Treatment | 270° C. × 8 h |
| Example 19 | A2 | 1.2 | Solution Treatment | 550° C. × 3 h |
| Comparative Example 19 | B2 | 1.2 | Normal Heat Treatment | 270° C. × 8 h |
| Example 20 | A5 | 1.2 | Solution Treatment | 550° C. × 3 h |
| Comparative Example 21 | B5 | 1.2 | Normal Heat Treatment | 270° C. × 8 h |
| Example 21 | A2 | 1.2 | Solution Treatment | 550° C. × 3 h |
| Comparative Example 21 | B2 | 1.2 | Normal Heat Treatment | 270° C. × 8 h |
| Example 22 | A2 | 1.2 | Solution Treatment | 550° C. × 3 h |
| Comparative Example 22 | B2 | 1.2 | Normal Heat Treatment | 270° C. × 8 h |
| Example 23 | A5 | 1.2 | Solution Treatment | 550° C. × 3 h |
| Comparative Example 23 | B5 | 1.2 | Normal Heat Treatment | 270° C. × 8 h |
| Example 24 | A2 | 1.2 | Solution Treatment | 550° C. × 3 h |
| Comparative Example 24 | B2 | 1.2 | Normal Heat Treatment | 270° C. × 8 h |
| Example 25 | A2 | 1.2 | Solution Treatment | 550° C. × 3 h |
| Comparative Example 25 | B2 | 1.2 | Normal Heat Treatment | 270° C. × 8 h |
| Example 26 | A2 | 1.2 | Solution Treatment | 550° C. × 3 h |
| Comparative Example 26 | B2 | 1.2 | Normal Heat Treatment | 270° C. × 8 h |

| | Condition of solution treatment step immediately after last wire drawing treatment | Condition of aging treatment | Tensile strength (MPa) | Tensile strength (Relative Value) | Elongation (%) | Elongation (Relative Value) |
|---|---|---|---|---|---|---|
| Example 14 | 550° C. × 1 min | 120° C. × 24 h | 243 | 109 | 16.4 | 357 |
| Comparative Example 14 | 550° C. × 1 min | 120° C. × 24 h | 222 | 100 | 4.6 | 100 |
| Example 15 | 550° C. × 4 s | 140° C. × 8 h | 225 | 121 | 15.8 | 376 |
| Comparative Example 15 | 550° C. × 4 s | 140° C. × 8 h | 186 | 100 | 4.2 | 100 |
| Example 16 | 550° C. × 12 s | 140° C. × 8 h | 245 | 116 | 15.8 | 405 |
| Comparative Example 16 | 550° C. × 12 s | 140° C. × 8 h | 212 | 100 | 3.9 | 100 |
| Example 17 | 550° C. × 8 min | 140° C. × 8 h | 232 | 110 | 14.2 | 355 |
| Comparative Example 17 | 550° C. × 8 min | 140° C. × 8 h | 211 | 100 | 4.0 | 100 |
| Example 18 | 550° C. × 1 min | 150° C. × 8 h | 251 | 108 | 14.9 | 355 |
| Comparative Example 18 | 550° C. × 1 min | 150° C. × 8 h | 232 | 100 | 4.2 | 100 |

TABLE 2-continued

| | | | | | | |
|---|---|---|---|---|---|---|
| Example 19 | 550° C. × 1 min | 150° C. × 8 h | 222 | 117 | 16.3 | 370 |
| Comparative Example 19 | 550° C. × 1 min | 150° C. × 8 h | 189 | 100 | 4.4 | 100 |
| Example 20 | 550° C. × 1 min | 140° C. × 8 h | 243 | 113 | 16.9 | 325 |
| Comparative Example 21 | 550° C. × 1 min | 140° C. × 8 h | 215 | 100 | 5.2 | 100 |
| Example 21 | 550° C. × 1 min | 150° C. × 8 h | 258 | 112 | 14.4 | 369 |
| Comparative Example 21 | 550° C. × 1 min | 150° C. × 8 h | 231 | 100 | 3.9 | 100 |
| Example 22 | 550° C. × 1 min | 150° C. × 8 h | 236 | 110 | 16.4 | 381 |
| Comparative Example 22 | 550° C. × 1 min | 150° C. × 8 h | 215 | 100 | 4.3 | 100 |
| Example 23 | 550° C. × 1 min | 140° C. × 8 h | 263 | 115 | 14.3 | 367 |
| Comparative Example 23 | 550° C. × 1 min | 140° C. × 8 h | 228 | 100 | 3.9 | 100 |
| Example 24 | 550° C. × 1 min | 150° C. × 8 h | 245 | 109 | 15.8 | 376 |
| Comparative Example 24 | 550° C. × 1 min | 150° C. × 8 h | 224 | 100 | 4.2 | 100 |
| Example 25 | 550° C. × 1 min | 150° C. × 8 h | 242 | 106 | 14.8 | 389 |
| Comparative Example 25 | 550° C. × 1 min | 150° C. × 8 h | 229 | 100 | 3.8 | 100 |
| Example 26 | 550° C. × 1 min | 150° C. × 8 h | 243 | 108 | 16.1 | 366 |
| Comparative Example 26 | 550° C. × 1 min | 150° C. × 8 h | 224 | 100 | 4.4 | 100 |

From the results shown in Tables 1 and 2, according to the manufacturing method of the aluminum alloy wire of one or more embodiments of the present invention, it was confirmed that the tensile strength and elongation of the obtained aluminum alloy wire can be improved.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATIONS OF REFERENCE NUMERALS

1 Rough drawing wire
2 First solution treatment material
4 Second solution treatment material
10 Aluminum alloy wire
11 Coating layer
20 Electric wire
30 Wire harness

The invention claimed is:

1. A method of manufacturing an aluminum alloy wire, comprising:

forming a rough drawing wire composed of an aluminum alloy, the aluminum alloy consisting of aluminum and additive elements, the additive elements consisting of:
- Si in an amount of 0.35 mass % to 0.75 mass %;
- Mg in an amount of 0.3 mass % to 0.7 mass %;
- V in an amount of 0.002 mass % or more;
- optionally Cu in an amount of 0.4 mass % or less;
- optionally Fe in an amount of 0.6 mass % or less;
- optionally Ti and/or B, wherein a total content of Ti and B is mass % or less;
- and unavoidable impurities;

obtaining an aluminum alloy wire by performing a treatment on the rough drawing wire, wherein the treatment comprises a first wire drawing treatment of obtaining a drawn wire material obtained by drawing the rough drawing wire, a second wire drawing treatment, and a third wire drawing treatment;

performing a normal heat treatment of the drawn wire material at a temperature of 100° C. to 400° C., after the first wire drawing treatment and before the second wire drawing treatment;

a first solution treatment that forms a first solution treatment material by forming a solid solution of the aluminum and the additive elements and then performing a quenching treatment on the solid solution, wherein the first solution treatment is performed after the second wire drawing treatment and directly before the third wire drawing treatment is performed;

a second solution treatment that forms a second solution treatment material by forming a solid solution of the aluminum and the additive elements and then performing a quenching treatment on the solid solution, wherein the second solution treatment is performed directly after the third wire drawing treatment is performed, and wherein the formation of the solid solution is performed for 10 minutes or less; and an aging treatment performed after the second solution treatment.

2. The method of manufacturing an aluminum alloy wire according to claim 1, wherein in the second solution treatment, the formation of the solid solution is performed at a temperature between 500° C. and 600° C.

3. The method of manufacturing an aluminum alloy wire according to claim 1, wherein the formation of the solid solution is performed for one minute or less in the second solution treatment.

4. The method of manufacturing an aluminum alloy wire according to claim 1, wherein the formation of the solid solution is performed for longer than 10 seconds in the second solution treatment.

5. The method of manufacturing an aluminum alloy wire according to claim 1, wherein the formation of the solid solution in the first solution treatment is performed for a longer time than a time for forming the solid solution in the second solution treatment.

6. The method of manufacturing an aluminum alloy wire according to claim 1, wherein in the aging treatment, $Mg_2Si$ as a precipitate is formed in an aluminum alloy constituting the second solution treatment material obtained in the second solution treatment.

7. A method of manufacturing an electric wire, comprising:
manufacturing the aluminum alloy wire according to claim 1; and
manufacturing an electric wire by coating the aluminum alloy wire with a coating layer.

8. A method of manufacturing a wire harness, comprising:
manufacturing the electric wire according to claim 7; and
manufacturing a wire harness by using the electric wires.

9. The method of manufacturing an aluminum alloy wire according to claim 1, wherein the rough drawing wire is formed using a swaging processing.

10. The method of manufacturing an aluminum alloy wire according to claim 1, wherein quenching occurs by rapidly cooling at a cooling rate of 100 K/min or more.

* * * * *